US012479218B2

(12) United States Patent
Fukunaga et al.

(10) Patent No.: US 12,479,218 B2
(45) Date of Patent: Nov. 25, 2025

(54) RECORDING MATERIAL CONVEYING DEVICE AND IMAGE FORMING SYSTEM

(71) Applicant: Konica Minolta, Inc., Tokyo (JP)

(72) Inventors: Masayuki Fukunaga, Nagareyama (JP); Satoshi Ogata, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 237 days.

(21) Appl. No.: 18/205,060

(22) Filed: Jun. 2, 2023

(65) Prior Publication Data

US 2023/0406011 A1 Dec. 21, 2023

(30) Foreign Application Priority Data

Jun. 20, 2022 (JP) ................................ 2022-098588

(51) Int. Cl.

| | |
|---|---|
| ***B65H 29/62*** | (2006.01) |
| ***B41J 11/42*** | (2006.01) |
| ***B65H 7/06*** | (2006.01) |
| ***B65H 29/60*** | (2006.01) |
| ***B65H 43/04*** | (2006.01) |
| ***G03G 15/00*** | (2006.01) |

(52) U.S. Cl.

CPC ................ *B41J 11/42* (2013.01); *B65H 7/06* (2013.01); *B65H 29/60* (2013.01); *B65H 29/62* (2013.01); *B65H 43/04* (2013.01); *G03G 15/5029* (2013.01); *G03G 15/6591* (2013.01); *B65H 2513/42* (2013.01)

(58) Field of Classification Search

CPC ........ B65H 29/58; B65H 29/60; B65H 29/62; B65H 2513/42; B65H 7/06; B65H 7/02; B65H 7/14; B65H 43/04; G03G 15/5029; G03G 15/6591; H04N 1/00724

See application file for complete search history.

(56) References Cited

U.S. PATENT DOCUMENTS

2011/0210505 A1* 9/2011 Tomii ...................... B65H 7/02
271/265.04

FOREIGN PATENT DOCUMENTS

| | | | |
|---|---|---|---|
| JP | 2020-8621 | A | 1/2020 |
| JP | 2020-128269 | A | 8/2020 |
| JP | 2020134539 | A | 8/2020 |

OTHER PUBLICATIONS

Japanese Office Action (JPOA) dated Sep. 24, 2024 issued for Japanese patent application No. 2022-098588 and its English machine translation.

* cited by examiner

*Primary Examiner* — Luis A Gonzalez
(74) *Attorney, Agent, or Firm* — RANKIN, HILL & CLARK LLP

(57) ABSTRACT

A recording material conveying device includes: a first conveyor that conveys a recording material supplied from a recording material supply part; a second conveyor that branches from the first conveyor and conveys the recording material without passing through an image forming part; a third conveyor that branches from the first conveyor and conveys the recording material via the image forming part; and a detector that detects a recording material characteristic of the recording material, wherein the recording material whose recording material characteristic has been detected by the detector can be ejected from the second conveyor.

18 Claims, 7 Drawing Sheets

RECORDING MATERIAL CONVEYING DEVICE AND IMAGE FORMING SYSTEM

The entire disclosure of Japanese patent Application No. 2022-098588, filed on Jun. 20, 2022, is incorporated herein by reference in its entirety.

BACKGROUND

Technological Field

The present invention relates to a recording material conveying device and an image forming system including the recording material conveying device.

Description of the Related Art

In an image forming device, a plurality of types of recording materials may be used. In this case, the quality of a formed image can be improved by appropriately setting image forming conditions such as the transfer voltage and the fixing temperature of a toner at the time of image formation according to the type and physical properties of the recording material. By conveying the recording material under more appropriate conveyance conditions according to the type and physical properties of the recording material, it is possible to curb occurrence of conveyance failure of the recording material such as a jam, image deviation, deviation of the recording material, and the like.

As an image forming device that optimizes image forming conditions according to the type and physical properties of a recording material in such a manner, for example, a configuration has been proposed in which a detector for detecting characteristics (hereinafter referred to as recording material characteristics) such as the type and physical properties of the recording material is arranged in a recording material conveyance path (JP 2020-128269 A, for example), and a configuration has been proposed in which when recording material characteristics detected by the detector are different from the settings, the recording material is ejected from the image forming device without forming an image on the recording material (see JP 2020-8621 A, for example).

In the above-described image forming device, the recording material whose recording material characteristics have been detected is ejected after passing through an image forming part. However, when a recording material having characteristics (charging, crease, thickness, rigidity, water content, and the like) that are not suitable for image formation is passed through the image forming part, there is a possibility that reliability of image formation decreases. For example, when a recording material deformed due to a crease or the like is conveyed, conveyance failure such as paper jam (so-called jam) is likely to occur, and conveyance reliability at the time of image formation decreases. In addition, in the detector, for example, when electrical resistance is measured as a recording material characteristic, the recording material may be charged. For example, in a case where the recording material is paper which is an insulator, while the number of digits changes depending on humidity, the surface electric resistance is about $10^{10}\Omega$ to $10^{12}\Omega$. In this case, the residual potential of the recording material does not discharge in a short time, sticking of the recording material occurs in the image forming part, and charge transfer which is important in the electrophotographic process is not correctly performed. Therefore, in the image forming part, the reliability of an image forming operation for image formation may decrease.

SUMMARY

In order to solve the above-described problems, embodiments of the present invention provide a recording material conveying device and an image forming system capable of curbing a decrease in reliability at the time of image formation.

To achieve the abovementioned object, according to an aspect of the present invention, a recording material conveying device reflecting one aspect of the present invention comprises: a first conveyor that conveys a recording material supplied from a recording material supply part; a second conveyor that branches from the first conveyor and conveys the recording material without passing through an image forming part; a third conveyor that branches from the first conveyor and conveys the recording material via the image forming part; and a detector that detects a recording material characteristic of the recording material, wherein the recording material whose recording material characteristic has been detected by the detector can be ejected from the second conveyor.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Note that the description will be given in the following order.

1. First embodiment of recording material conveying device and image forming system
2. Second embodiment of recording material conveying device and image forming system
3. Third embodiment of recording material conveying device and image forming system <1. First Embodiment of Recording Material Conveying Device and Image Forming System>

Figure 1:
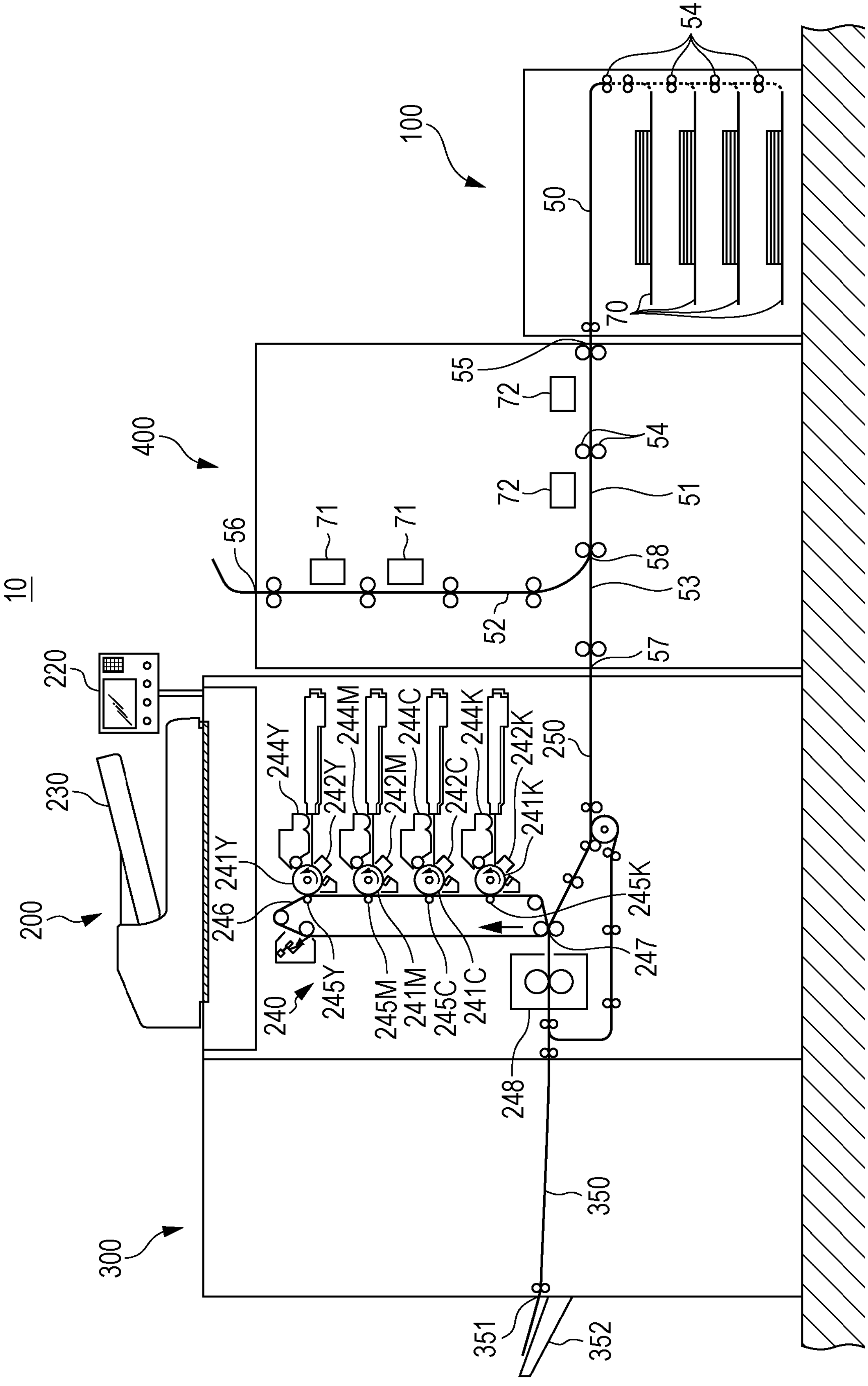
FIG. 1 is a diagram illustrating a schematic configuration of an image forming system according to a first embodiment.

FIG. 1 is a schematic configuration diagram of an image forming system including a recording material conveying device according to the present embodiment.

An image forming system 10 illustrated in FIG. 1 includes a recording material supply device 100, a recording material conveying device 400, an image forming device 200, and a post-processing device 300.

In the image forming system 10, a recording material S stacked in the recording material supply device 100 is supplied to the image forming device 200 via the recording material conveying device 400. Then, after an image is formed on the recording material S by the image forming device 200, the recording material S is carried out from the image forming device 200 to the post-processing device 300. Then, after predetermined post-processing is performed on the recording material S after image forming processing in the post-processing device 300, the recording material S is ejected from the post-processing device 300.

[Recording Material Supply Device]

The recording material supply device 100 stores a recording material for image formation in the image forming system 10, and supplies the recording material S to the image forming device 200 according to an image forming job. As illustrated in FIG. 1, the recording material supply device 100 includes a conveyor 50, a recording material supply part 70 as a recording material storage part, and the like.

The recording material supply part 70 includes, for example, a plurality of sheet feeding trays arranged in the recording material supply device 100. The recording material supply part 70 can stack a plurality of recording materials S. FIG. 1 illustrates a configuration including four recording material supply parts 70 arranged vertically. In the recording material supply parts 70, recording materials of different types and sizes are stored separately.

The conveyor 50 includes a drawing roller (not illustrated) for drawing the recording material from each recording material supply part 70, a plurality of conveyance rollers 54 for conveying the recording material provided along a predetermined recording material conveyance path, and the like. Therefore, the conveyance paths of the conveyor 50 merge into one path from the plurality of recording material supply parts 70 and is connected to the recording material conveying device 400. As a result, the conveyor 50 drives the conveyance roller 54 to convey the recording material S fed from the recording material supply part 70 to the recording material conveying device 400.

[Recording Material Conveying Device]

The recording material conveying device 400 includes a carry-in port 55 through which the recording material S is carried into the recording material conveying device 400, a first conveyor 51, a second conveyor 52, and a third conveyor 53 that convey the recording material S, a first ejector 56 and a carry-out port 57 for carrying out the recording material S, and a first detector 71 and a second detector 72 as detectors that detect characteristics of the recording material S.

(Conveyor)

The recording material conveying device 400 includes the first conveyor 51, the second conveyor 52, and the third conveyor 53. The first conveyor 51, the second conveyor 52, and the third conveyor 53 include a plurality of conveyance rollers 54 and the like for conveying the recording material S along a conveyance path forming each conveyor.

The first conveyor 51 forms a conveyance path between a carry-in port 55 through which the recording material S is carried into the recording material conveying device 400 from the recording material supply device 100 and a branching part 58 where the second conveyor 52 and the third conveyor 53 branch from the first conveyor 51. That is, the conveyance path of the recording material S branches into the second conveyor 52 and the third conveyor 53 on the downstream side of the first conveyor 51 and the branching part 58 in the recording material conveyance direction. With this configuration, the recording material conveyed by the first conveyor 51 is conveyed to either the second conveyor 52 or the third conveyor 53 on the downstream side of the branching part 58.

The second conveyor 52 forms a conveyance path from the branching part 58 to the first ejector 56 provided in an upper part of the recording material conveying device 400 on the downstream side of the first conveyor 51 in the recording material conveyance direction. The recording material S conveyed from the first conveyor 51 to the second conveyor 52 through the branching part 58 is ejected from the first ejector 56 to the outside of the recording material conveying device 400 and the image forming system 10. Therefore, the second conveyor 52 is provided in the recording material conveying device 400 in order to convey the recording material S without passing through an image forming part 240 of the image forming device 200.

The third conveyor 53 forms a conveyance path from the branching part 58 to the carry-out port 57 on the downstream side of the first conveyor 51 in the recording material conveyance direction. The recording material S conveyed from the first conveyor 51 to the second conveyor 52 through the branching part 58 passes through the carry-out port 57 and is conveyed from the recording material conveying device 400 to the image forming device 200. Therefore, the third conveyor 53 is provided in the recording material conveying device 400 in order to convey the recording material S via the image forming part 240 of the image forming device 200.

Note that while the image forming system 10 has a configuration in which the recording material S conveyed by the third conveyor 53 is ejected from a second ejector 351 arranged in the post-processing device 300, in a case where the recording material conveying device 400 is used alone, the carry-out port 57 is used as an ejector (second ejector) of the recording material S conveyed by the third conveyor 53.

The first conveyor 51 includes the second detector 72 that detects characteristics of the recording material S. In addition, the second conveyor 52 includes the first detector 71 that detects characteristics of the recording material S.

Recording material characteristics of the recording material S conveyed to the first conveyor 51 are detected by the second detector 72 arranged in the path. Further, recording material characteristics of the recording material S conveyed from the first conveyor 51 to the second conveyor 52 through the branching part 58 are detected by the first detector 71 arranged in the path. The first detector 71 is arranged along the conveyance path of the second conveyor 52 between the branching part 58 and the first ejector 56. The second detector 72 is arranged along the conveyance path of the first conveyor 51 between the carry-in port 55 and the branching part 58.

That is, in the first conveyor 51, the second detector 72 is arranged on the upstream side of the branching part 58 in the recording material conveyance direction, and in the second conveyor 52, the first detector 71 is arranged on the downstream side of the branching part 58 in the recording material conveyance direction. Furthermore, only the recording material S conveyed from the first conveyor 51 to the second conveyor 52 is conveyed to the first detector 71. On the other hand, since all the recording materials S conveyed through the first conveyor 51 are conveyed to the second detector 72, not only the recording material S conveyed from the first conveyor 51 to the second conveyor 52 through the branching part 58, but also the recording material S conveyed from the first conveyor 51 to the third conveyor 53 through the branching part 58 is conveyed.

Therefore, the first detector 71 detects recording material characteristics of only some of the recording materials S conveyed to the recording material conveying device 400, which are conveyed by the second conveyor 52 through the branching part 58. Meanwhile, the second detector 72 can detect recording material characteristics of all the recording materials S conveyed to the recording material conveying device 400 regardless of whether the conveyance path after passing through the branching part 58 is the second conveyor 52 or the third conveyor 53.

Note that FIG. 1 illustrates an example in which two media sensors are arranged as each of the first detector 71 and the second detector 72.

The second conveyor 52 is preferably configured such that the conveyance distance of the recording material S on the downstream side of the branching part 58 is equal to or longer than the length of the long side of the recording material S that can be accommodated in the recording material supply device 100 and conveyed by the recording material conveying device 400. For example, the second conveyor 52 is preferably configured to have a length equal to or longer than the long side of the largest standard size except for a long sheet such as a roll sheet.

Note that the conveyance distance of the recording material S on the upstream side of the branching part 58 of the first conveyor 51 is not particularly limited as long as a necessary number of the second detectors 72 can be arranged and the recording material S can be stably conveyed.

In the third conveyor 53, the conveyance distance of the recording material S from the branching part 58 to the carry-out port 57 is preferably shorter than the length of the second conveyor 52. The third conveyor 53 is preferably configured to have a length that minimizes the conveyance distance of the recording material S from the branching part 58 to the carry-out port 57.

(Detector)

Figure 2:
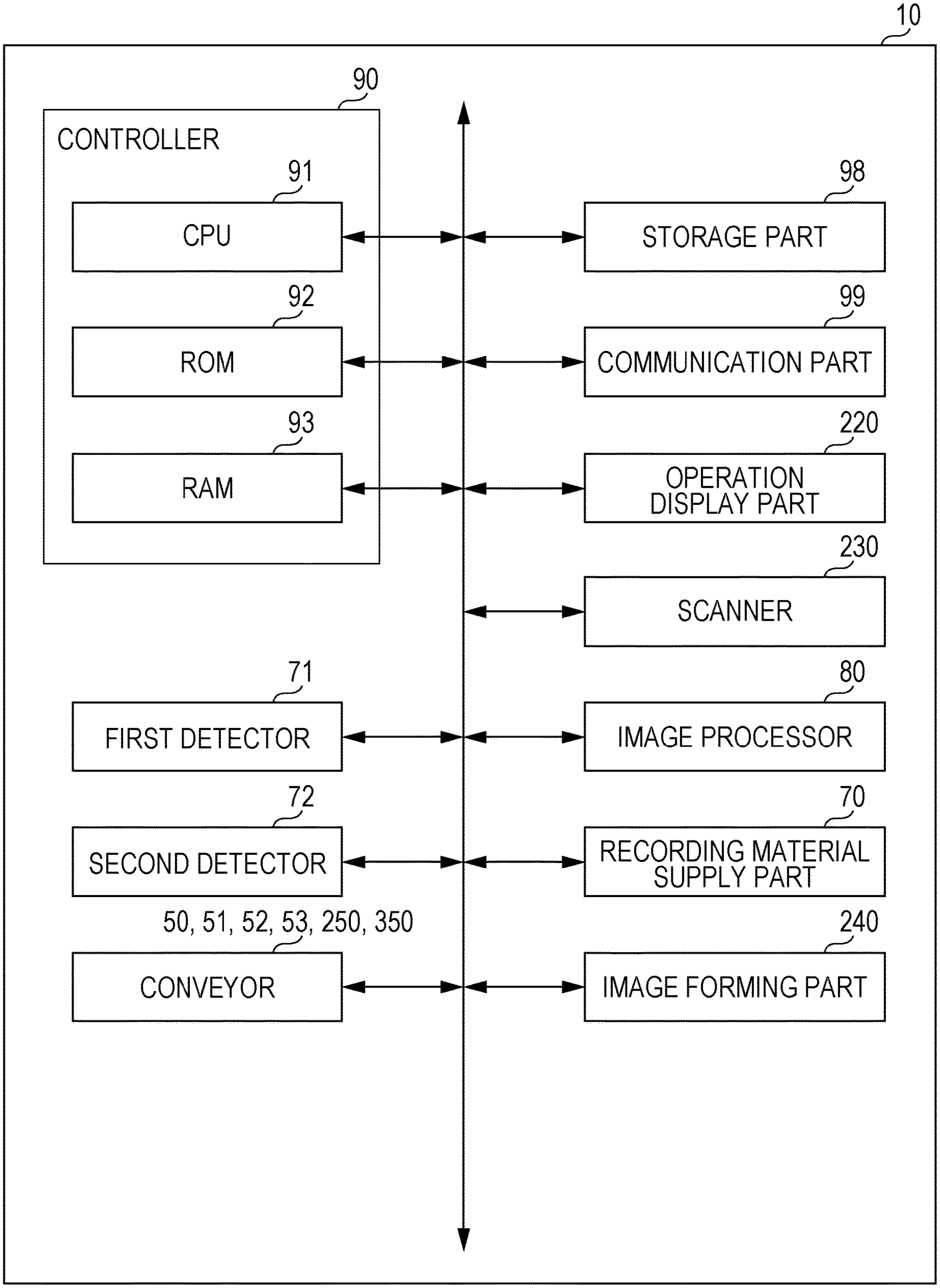
FIG. 2 is a system block diagram of the image forming system according to the first embodiment.

The first detector 71 detects recording material characteristics of the recording material S conveyed to the second conveyor 52 on the basis of the control of a controller 90 (FIG. 2). The second detector 72 detects recording material characteristics of the recording material S conveyed to the first conveyor 51 on the basis of the control of the controller 90 (FIG. 2). The first detector 71 and the second detector 72 include, for example, a known media sensor or the like.

The first detector 71 arranged in the second conveyor 52 preferably detects recording material characteristics in a state where conveyance of the recording material S is stopped or in a state where conveyance of the recording material S is lower than the normal conveyance speed for image formation. By detecting the recording material characteristics in the stopped state or the low-speed conveyance state of the recording material S, it is possible to improve the detection accuracy of the recording material characteristics. Therefore, a sensor that can improve the detection accuracy of recording material characteristics and detects recording material characteristics in a state where the conveyance of the recording material S is stopped or in a state where the conveyance speed is reduced is preferably arranged in the first detector 71.

In addition, the second detector 72 arranged in the first conveyor 51 preferably detects recording material characteristics in a state where the recording material S is conveyed at a normal conveyance speed at the time of image formation. By detecting the recording material characteristics at the normal conveyance speed, the recording material characteristics can be detected without lowering the productivity of the image forming job. Therefore, a sensor that detects recording material characteristics of the recording material S in a conveyed state is preferably arranged in the second detector 72.

The first detector 71 and the second detector 72 detect a type (e.g., plain paper, high-quality paper, glossy paper, and the like) and a size of the recording material S, physical properties of the recording material S, and the like. As the physical properties of the recording material S, for example, thickness, basis weight, state of the surface such as smoothness, rigidity, charge amount, water content, paper grain (angle in fiber direction of recording material), and the like are detected.

In addition, the first detector 71 and the second detector 72 include various sensors for detecting recording material characteristics. For example, the first detector 71 and the second detector 72 include an imaging sensor for detecting the type of the recording material S. The imaging sensor includes a light source that irradiates the front surface of the recording material S with light, a light source that irradiates the back surface of the recording material S with light, and an imaging element that images the front surface of the recording material S. Then, an image in a reflected state when the front of the recording material S is irradiated and the image in a transmitted state when the back of the recording material S is irradiated are acquired.

In addition, the first detector 71 includes an optical sensor and a weight sensor for detecting the size, weight, and basis weight of the recording material S. The optical sensor includes a light receiving element that detects an end part of the recording material S on an inspection table through which the conveyed recording material S passes. The weight sensor detects the weight of the recording material S in a unit area from a change in the weight of the inspection table when the recording material S passes. Then, the size and area of the recording material S can be detected from the output of the optical sensor, and the basis weight can be acquired from the weight of the unit area of the recording material S detected by the weight sensor.

For example, the first detector 71 includes a sensor that detects an electrical characteristic of the recording material S as a recording material characteristic. The first detector 71 charges the recording material S by the sensor to detect an electrical resistance value, a charge amount, a water content, and the like of the recording material S as recording material characteristics of the recording material S.

In addition, for example, the first detector 71 includes a sensor that detects a recording material characteristic in a test of directly coming into contact with the recording material S. The first detector 71 detects the rigidity of the recording material S as a recording material characteristic by a sensor that comes into direct contact with the recording material S.

The second detector 72 preferably includes a sensor that detects recording material characteristics without coming into contact with the recording material S. The second detector 72 detects recording material characteristics without deforming the recording material characteristics by an external force, and thus it is possible to curb occurrence of conveyance failure, paper jam (so-called jam), and the like at the time of conveyance of the recording material S in the image forming device 200, particularly at the time of conveyance of the recording material S in the image forming part 240 or a fixer 248.

The second detector 72 preferably includes a sensor that detects recording material characteristics without charging the recording material S. The second detector 72 detects recording material characteristics without charging the recording material S. Thus, it is possible to reduce conveyance failure (jam) due to adhesion or the like of the recording material S at the time of conveyance, and accurately perform charge transfer which is important in the electrophotographic process in the image forming part 240, such as transfer of a toner image from an intermediate transfer belt 246 to the recording material S.

Since the second detector 72 detects recording material characteristics without coming into contact and without charging, in the image forming system 10, it is possible to curb a decrease in reliability of image formation by reducing conveyance failure of the recording material S and improving transfer accuracy in image formation.

[Image Forming Device]

The image forming device 200 illustrated in FIG. 1 includes an operation display part 220, a scanner 230, the image forming part 240, a conveyor 250, and the like.

The operation display part 220 includes an operation part and a display part.

The display part includes, for example, a display such as a liquid crystal display (LCD), and displays various screens in accordance with an instruction of a display signal input from the controller 90 (FIG. 2).

The operation part includes a touch panel formed to cover a display screen of the display part, and various operation buttons such as a numeric button and a start button, and outputs an operation signal based on a user's operation to the controller 90 described later. The operation part receives an operation instruction from the user.

The scanner 230 reads a document image by optically scanning a document conveyed onto a contact glass from an auto document feeder (ADF) or a document placed on the contact glass and forming an image of light reflected from light illuminated from a light source and scanned the document on a light receiving surface of a charge coupled device (CCD) sensor, and performs A/D conversion on the read image to generate image data.

The image forming part 240 forms an image on the recording material S on the basis of the image data. The image forming part 240 includes photosensitive drums 241Y, 241M, 241C, and 241K corresponding to the respective colors of yellow (Y), magenta (M), cyan (C), and black (K), charging parts 242Y, 242M, 242C, and 242K, exposure parts 243Y, 243M, 243C, and 243K, developing parts 244Y, 244M, 244C, and 244K, primary transfer rollers 245Y, 245M, 245C, and 245K. The image forming part 240 includes the intermediate transfer belt 246, a secondary transfer roller 247, and the fixer 248.

The charging parts 242Y, 242M, 242C, and 242K uniformly charge the photosensitive drums 241Y, 241M, 241C, and 241K.

The exposure parts 243Y, 243M, 243C, and 243K include a laser light source, a polygon mirror, a lens, and the like, and scan and expose surfaces of the photosensitive drums 241Y, 241M, 241C, and 241K with a laser beam on the basis of image data of each color to form electrostatic latent images.

The developing parts 244Y, 244M, 244C, and 244K attach toners of each color to the electrostatic latent images on the photosensitive drums 241Y, 241M, 241C, and 241K to perform development.

The primary transfer rollers 245Y, 245M, 245C, and 245K sequentially transfer the toner images of each color formed on the photosensitive drums 241Y, 241M, 241C, and 241K onto the intermediate transfer belt 246 (primary transfer). That is, color toner images in which toner images of four colors are superimposed are formed on the intermediate transfer belt 246.

The secondary transfer roller 247 collectively transfers the color toner images on the intermediate transfer belt 246 onto one surface of the recording material S supplied from a supply tray (secondary transfer).

The fixer 248 causes the recording material S to pass through a nip part formed by a fixing roller and a pressure roller, thereby fixing the toner image on the recording material S by heating and pressurization.

The conveyor 250 includes a plurality of conveyance rollers 54 and the like provided along a predetermined conveyance path to convey the recording material S. The conveyor 250 drives the conveyance rollers 54 to convey the recording material S along the predetermined conveyance path in the image forming device 200. Then, the recording material S after the image formation is carried out to the post-processing device 300.

[Post-Processing Device]

The recording material S on which an image is formed in the image forming device 200 is carried into the post-processing device 300. The post-processing device 300 includes, for example, a plurality of post-processing units, and predetermined post-processing is performed in the post-processing unit designated by the job. For example, the post-processing device 300 includes post-processing units that perform processing such as perforation processing, folding processing, foil stamping processing, binding, cutting processing, stapling, gluing, and binding.

In the post-processing device 300, the recording material S having been subjected to the image forming processing and conveyed from the image forming device 200 is conveyed to a post-processing unit (not illustrated) by a conveyor 350, and predetermined post-processing is performed on the recording material S. The recording material S conveyed by the conveyor 350 is ejected from the second ejector 351 provided along the conveyance path and is ejected to a sheet ejection tray 352.

[System Block Diagram]

FIG. 2 illustrates a system block diagram of devices forming the above-described image forming system illustrated in FIG. 1. As illustrated in FIG. 2, the image forming system 10 includes the controller 90, a storage part 98, a communication part 99, the scanner 230, an image processor 80, the recording material supply part 70, the image forming part 240, the first detector 71, the second detector 72, and the conveyors 51, 52, and 53,250,350. Note that, hereinafter, description of configurations overlapping with the description of the above-described image forming system 10 illustrated in FIG. 1 will be omitted.

The controller 90 includes, for example, a central processing unit (CPU) 91, a read only memory (ROM) 92, a random access memory (RAM) 93, and the like. The CPU 91 reads various processing programs stored in the ROM 92, develops the programs in the RAM 93, and centrally controls the operation of each part of the image forming system 10 according to the developed programs.

The ROM 92 stores various processing programs for controlling each part of the image forming system and parameters, table data, various files, and the like necessary for executing the programs.

The RAM 93 includes a volatile semiconductor memory, and forms a work area for temporarily storing various processing programs, input or output data, parameters, and the like read from the ROM 92 in various processing executed and controlled by the CPU 91.

The storage part 98 stores, for example, image data and the like received from an external device. In addition, the storage part 98 stores various processing programs executed by the CPU 91, information regarding a processing function of the own device necessary for executing the programs, image data read by the scanner 230, image data input from a client device (not illustrated), recording material characteristics of the recording material S detected by the first detector 71 and the second detector 72, and the like. The storage part 98 may include, for example, a non-volatile memory such as a hard disk drive (HDD), a solid state drive (SSD), or a flash memory.

The communication part 99 includes a network interface card (NIC), a modem, or the like, connects the recording material supply device 100, the recording material conveying device 400, the image forming device 200, and the post-processing device 300 to a communication network such as a local area network (LAN) or a wide area network (WAN), and transmits and receives various data to and from an external information device (e.g., client device).

The operation display part 220 includes a touch panel or the like provided with a pressure-sensitive or capacitive operation part (touch sensor) in which transparent electrodes are arranged in a lattice pattern on a display part such as a liquid crystal display (LCD) or an organic electro luminescence (EL) display, and functions as a display part and an operation part. The display part displays various operation screens in accordance with a display control signal input from the controller 90. The operation part receives various input operations by the user and outputs an operation signal to the controller 90.

The scanner 230 reads a document image by optically scanning a document placed on a contact glass and forming an image of light reflected from the document on a light receiving surface of a charge coupled device (CCD) sensor. The image (analog image signal) read by the scanner 230 is subjected to predetermined image processing in the image processor 80.

The image processor 80 includes a circuit that performs analog-digital (A/D) conversion processing, a circuit that performs digital image processing, and the like. The image processor 80 generates digital image data by performing A/D conversion processing on an analog image signal from the scanner 230. Furthermore, the image processor 80 analyzes a print job acquired from an external information device (e.g., client device), rasterizes each page of the document, and generates digital image data. Then, the image processor 80 performs image processing such as color conversion processing, correction processing (shading correction or the like) according to initial setting or user setting, and compression processing on the image data as necessary, and outputs the image data after the image processing to the image forming part 240.

[Functional Configuration of Controller]

Figure 3:
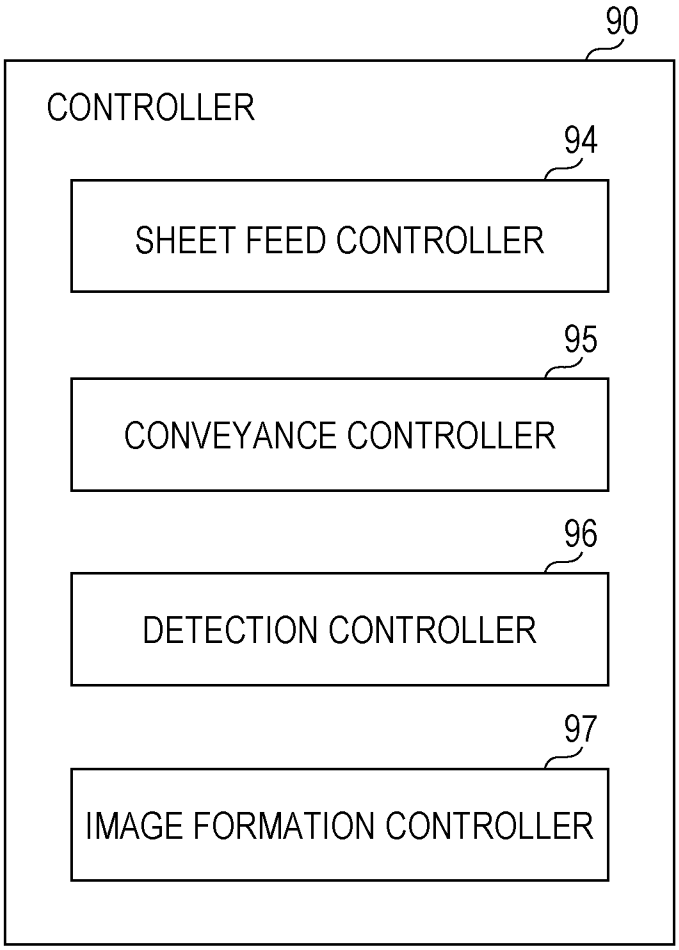
FIG. 3 is a functional block diagram of a controller of the image forming system according to the first embodiment.

Next, a functional configuration of the controller 90 will be described. FIG. 3 is a functional block diagram of the controller 90. As illustrated in FIG. 3, the controller 90 includes a sheet feed controller 94, a conveyance controller 95, a detection controller 96, and an image formation controller 97.

The sheet feed controller 94 controls supply of the recording material S from the recording material supply part 70 to the conveyor 50 in the recording material supply device 100. The sheet feed controller 94 supplies the recording material S to the conveyor 50 in accordance with the conveyance control of the recording material S by the conveyance controller 95.

The conveyance controller 95 controls the operation of the conveyance structure of the recording material S among and in the devices including the recording material supply device 100, the recording material conveying device 400, the image forming device 200, and the post-processing device 300 forming the image forming system 10. For example, the conveyance controller 95 controls the conveyance of the recording material S by controlling driving of the conveyor 50 of the recording material supply device 100, the first conveyor 51, the second conveyor 52, and the third conveyor 53 of the recording material conveying device 400, the conveyor 250 of the image forming device 200, the conveyor 350 of the post-processing device 300, and other conveyors of the image forming system 10. The conveyance controller 95 controls the timings of the stop and start of driving of each driver, the adjustment of the driving speed, and the like according to the conveyance condition in accordance with the recording material characteristics of the recording material S. This control interlocks the drive units of the devices of the image forming system 10 to control the conveyance of the recording material S in the image forming system 10.

In addition, the conveyance controller 95 sets the conveyance condition of the recording material S according to the recording material characteristics acquired by the detection controller 96. For example, the conveyance controller 95 acquires conveyance conditions according to recording material characteristics from data stored in the storage part 98 or the like. Then, the conveyance controller 95 sets conveyance conditions of each configuration of the conveyor 50, the first conveyor 51, the second conveyor 52, the third conveyor 53, the conveyor 250, and the conveyor 350 on the basis of the data acquired from the storage part 98 or the like.

In addition, in the recording material conveying device 400, the conveyance controller 95 selects the conveyance path of the recording material S conveyed by the first conveyor 51 from either the second conveyor 52 or the third conveyor 53, and switches the conveyance path of the recording material S at the branching part 58. Then, the conveyance controller 95 controls driving of the second conveyor 52 or the third conveyor 53 selected as the conveyance path to convey the recording material S. The conveyance controller 95 conveys at least one recording material S to the second conveyor 52 when conveying the plurality of recording materials S in the print job.

In the first conveyor 51 and the third conveyor 53, the conveyance controller 95 drives the conveyance speed of the recording material S at a normal speed at the time of image formation. Then, the conveyance controller 95 conveys the recording material S from the recording material conveying device 400 to the image forming device 200 by conveying the recording material S by the first conveyor 51 and the third conveyor 53.

Furthermore, in the second conveyor 52, the conveyance controller 95 reduces the conveyance speed after the entire recording material S is conveyed to the second conveyor 52, that is, after the rear end of the recording material S passes through the branching part 58. Then, after the recording material S reaches the first detector 71 that detects recording material characteristics, the recording material S is conveyed at a lowered speed at which the first detector 71 can detect the recording material characteristics with high accuracy. Furthermore, after conveying the recording material S to the position where the recording material characteristics can be detected by the first detector 71, the conveyance controller 95 may stop the conveyance of the recording material S until the detection of recording material characteristics by the first detector 71 is completed.

Further, the conveyance controller 95 conveys the recording material S whose recording material characteristics have been detected in the second conveyor 52, and ejects the recording material S from the first ejector 56 to the outside of the recording material conveying device 400.

The detection controller 96 controls detection of the recording material characteristics of the recording material S by the first detector 71 and the second detector 72. For example, when the recording material S is conveyed to the second conveyor 52 provided with the first detector 71, the detection controller 96 instructs the first detector 71 to execute detection of the recording material characteristics. Based on this instruction, the first detector 71 starts detecting the recording material characteristics of the recording material S. In addition, the detection controller 96 instructs the second detector 72 to execute detection of the recording material characteristics while the recording material S is passing through the first conveyor 51 in which the second detector 72 is arranged.

In addition, the detection controller 96 receives various data detected by the sensors of the first detector 71 and the second detector 72, and calculates the recording material characteristics of the recording material S on the basis of these pieces of data. For example, in a configuration in which the image forming system 10 includes a plurality of first detectors 71, the detection controller 96 combines data acquired from the plurality of first detectors 71 to calculate the recording material characteristics of the recording material S. In a configuration in which the image forming system 10 includes a plurality of second detectors 72, the detection controller 96 combines data acquired from the plurality of second detectors 72 to calculate the recording material characteristics of the recording material S.

The image formation controller 97 controls an image forming operation in the image forming part 240 of the image forming device 200. In addition, the image formation controller 97 sets image forming conditions according to the recording material characteristics acquired by the detection controller 96. For example, the image formation controller 97 acquires image forming conditions according to recording material characteristics from data stored in the storage part 98 or the like. Then, the image formation controller 97 sets operation conditions for each configuration of the image forming part 240 on the basis of the data acquired from the storage part 98 or the like. Then, the operation of each configuration of the image forming part 240 is controlled according to the set operation conditions, and an image is formed on the recording material S on the basis of image data.

[Detection of Recording Material Characteristics]

Figure 4:
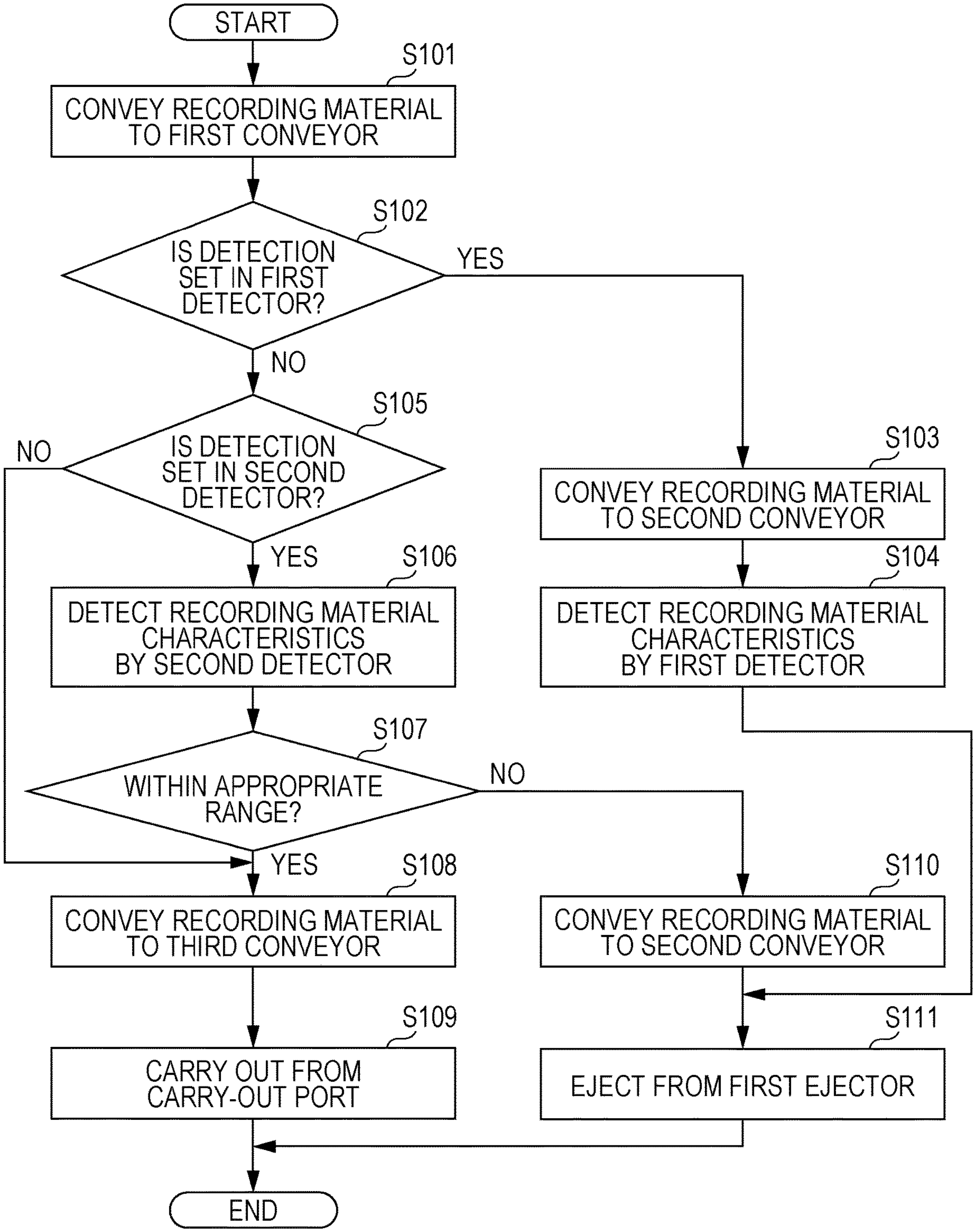
FIG. 4 is a flowchart of recording material characteristic detection processing in the image forming system according to the first embodiment.

Next, recording material characteristic detection processing in the image forming system 10 will be described. FIG. 4 is a flowchart of recording material characteristic detection processing. Note that in the flowchart illustrated in FIG. 4, conveyance of the recording material in the recording material conveying device 400 and detection of recording material characteristics will be mainly described.

First, in the image forming system 10, the controller 90 conveys the recording material S from the conveyor 50 of the recording material supply device 100 to the first conveyor 51 of the recording material conveying device 400 (step S101).

Next, the controller 90 determines whether a measurement mode is set such that recording material characteristics of the recording material S are detected by the first detector 71 according to an instruction of the user or the like (step S102).

If the measurement by the first detector 71 is set (Yes in step S102), the conveyance controller 95 switches, at the branching part 58, the conveyance path of the recording material S conveyed to the first conveyor 51 and conveys the recording material S to the second conveyor 52 (step S103).

Then, the detection controller 96 detects the recording material characteristics of the recording material S conveyed to the second conveyor 52 using the first detector 71 (step S104). Then, during the period in which the recording material characteristics are detected by the first detector 71, the conveyance controller 95 stops the conveyance of the recording material S in the second conveyor 52 or conveys the recording material S at a low speed. In addition, after the recording material S passes through the branching part 58, the conveyance controller may convey the next recording material S from the recording material supply device 100 to the first conveyor 51 while the recording material characteristics are being detected by the first detector 71.

If the measurement by the first detector 71 is not set (No in step S102), the controller 90 determines whether the measurement mode is set such that the recording material characteristics of the recording material S are detected by the second detector 72 according to an instruction of the user or the like (step S105).

If the measurement by the second detector 72 is set (Yes in step S105), the detection controller 96 detects the recording material characteristics of the recording material S conveyed to the first conveyor 51 using the second detector 72 (step S106). At this time, while the recording material characteristics are being detected by the second detector 72, the conveyance controller 95 preferably conveys the recording material S without changing the conveyance speed in the first conveyor 51.

Next, the detection controller 96 determines whether the recording material characteristics of the recording material S detected by the second detector 72 are within an appropriate range set as an image forming condition (step S107).

If the measurement by the second detector 72 is not set (No in step S105) or if the recording material characteristics of the recording material S are within the appropriate range (Yes in step S107), the conveyance controller 95 conveys the recording material S conveyed by the first conveyor 51 to the third conveyor 53 by switching the conveyance path at the branching part 58 (step S108).

Then, the conveyance controller 95 carries out the recording material S conveyed by the third conveyor 53 from the carry-out port 57 (step S109). The conveyance controller 95 conveys the recording material S from the recording material conveying device 400 to the image forming device 200 by carrying out the recording material S from the carry-out port 57.

If the recording material characteristics of the recording material S are not within the appropriate range (No in step S107), the conveyance controller 95 switches, at the branching part 58, the conveyance path of the recording material S conveyed to the first conveyor 51 and conveys the recording material S to the second conveyor 52 (step S110).

After the first detector 71 detects the recording material characteristics of the recording material S in step S104 or after the recording material S is conveyed to the second conveyor 52 in step S110, the conveyance controller 95 ejects the recording material S conveyed by the second conveyor 52 from the first ejector 56 (step S111).

After the recording material S is carried out from the first ejector 56 or the carry-out port 57, the processing according to this flowchart is terminated.

In the processing according to the above-described flowchart, the recording material S whose recording material characteristics are to be detected by the first detector 71 is conveyed from the first conveyor 51 to the second conveyor 52, and the recording material characteristics are detected by the first detector 71. Then, the recording material S whose recording material characteristics have been detected by the first detector 71 is ejected from the first ejector 56 of the recording material conveying device 400 without being conveyed to the image forming device 200. As a result, the recording material S charged by electrical detection in the first detector 71 or the recording material S having a crease or the like caused by contact can be ejected to the outside of the image forming system 10 without being conveyed to the image forming part 240 of the image forming device 200.

As a result, in the image forming part 240, it is possible to curb occurrence of conveyance failure (jam) due to adhesion of the charged recording material S to the conveyor or the like and curb inhibition of charge transfer in the electrophotographic process, and thereby curb a decrease in reliability of image formation.

Further, it is possible to curb occurrence of conveyance failure such as jam due to the recording material deformed by an external force at the time of detecting the recording material characteristics.

In addition, the recording material characteristics of the recording material S whose recording material characteristics are not detected by the first detector 71 are detected by the second detector 72 arranged in the first conveyor 51. Then, in a case where the recording material characteristics detected by the second detector 72 are not within a predetermined range, the recording material S is conveyed to the second conveyor 52 and ejected from the first ejector 56. In particular, in a case where the sheet type, the thickness, the charging rate, and the like as recording material characteristics are out of the predetermined range, the recording material S is ejected to the outside without being conveyed to the image forming part 240, whereby occurrence of conveyance failure (jam) and decrease in reliability due to inhibition of charge transfer in the electrophotographic process can be curbed.

<2. Second Embodiment of Recording Material Conveying Device and Image Forming System>

Next, a second embodiment of a recording material conveying device and an image forming system will be described. Note that the image forming system according to the second embodiment differs from the image forming system according to the above-described first embodiment only in the configuration of a recording material conveyor from a recording material conveying device to a post-processing device and the arrangement of a detector. Therefore, only the configurations related to the recording material conveyor and the detector will be described, and the description of the same configurations as those of the above-described first embodiment will be omitted.

Figure 5:
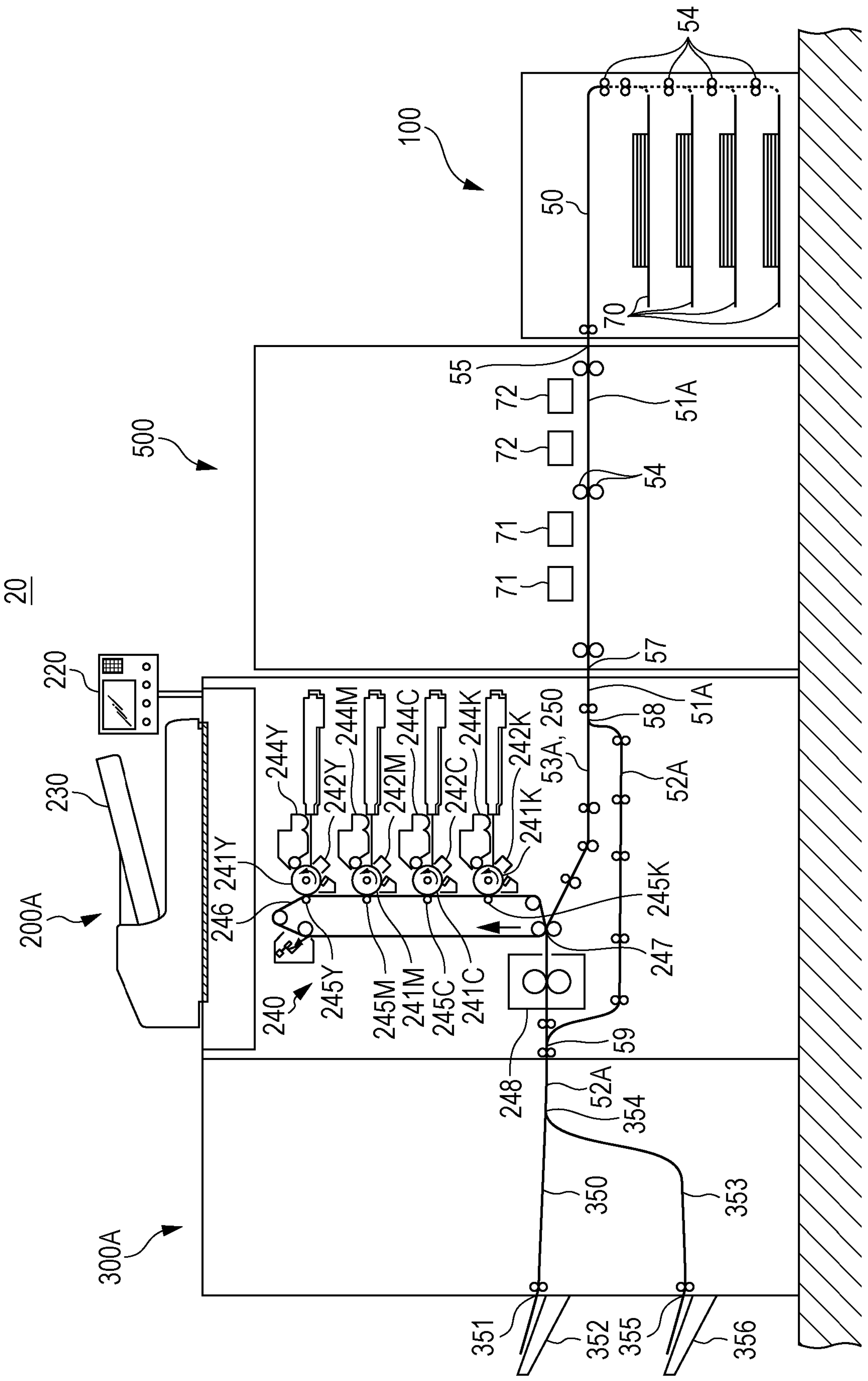
FIG. 5 is a diagram illustrating a schematic configuration of an image forming system according to a second embodiment.

FIG. 5 illustrates configurations of the recording material conveying device and the image forming system according to the second embodiment. As illustrated in FIG. 5, an image forming system 20 includes a recording material supply device 100, a recording material conveying device 500, an image forming device 200A, and a post-processing device 300A. In the image forming system 20 illustrated in FIG. 5, the recording material supply device 100 has the same configuration as that of the above-described first embodiment.

[Recording Material Conveying Device]

The recording material conveying device 500 includes a carry-in port 55 through which a recording material S is carried into the recording material conveying device 500, a first conveyor 51A that conveys the recording material S, and a carry-out port 57 that carries out the recording material S from the first conveyor 51A to the image forming device 200A. In addition, the first conveyor 51A includes a first detector 71 and a second detector 72 for detecting recording material characteristics of the recording material S.

In the first conveyor 51A, the second detector 72 is arranged on the upstream side of the first detector 71 in the recording material conveyance direction. A plurality of first detectors 71 and a plurality of second detectors 72 are provided on the first conveyor 51A. Note that the arrangement order of the first detector 71 and the second detector 72 is not particularly limited, and either may be arranged on the upstream side, and the first detector 71 and the second detector 72 may be mixed.

The first conveyor 51A is preferably configured to have a length that minimizes the conveyance distance of the recording material S from the carry-in port 55 to the carry-out port 57.

[Image Forming Device]

The image forming device 200A can have the same configuration as that of the above-described first embodiment except for the configuration of a recording material conveyance path.

The image forming device 200A includes a part of the first conveyor 51A, and a second conveyor 52A and a third conveyor 53A into which the first conveyor 51A branches on the downstream side in the recording material conveyance direction. Further, the image forming device 200A includes a branching part 58 where the second conveyor 52A and the third conveyor 53A branch from the first conveyor 51A, and a merging part 59 where the branched third conveyor 53A joins the second conveyor 52A again.

The second conveyor 52A forms a conveyance path for carrying out the recording material S from the image forming device 200A without passing through an image forming part 240. That is, the second conveyor 52A includes a conveyance path from the branching part 58 in the image forming device 200A to a branching part 354 in the post-processing device 300A. Therefore, the recording material S conveyed to the second conveyor 52A is conveyed from the first conveyor 51A to the second conveyor 52A through the branching part 58, further passes through the merging part 59, and is conveyed to the post-processing device 300A.

The third conveyor 53A forms a conveyance path that allows the recording material S to pass through the image forming part 240. The third conveyor 53A includes a conveyance path from the branching part 58 to the merging part 59 in the image forming device 200. Therefore, the recording material S conveyed to the third conveyor 53A is conveyed from the first conveyor 51A to the third conveyor 53A through the branching part 58, passes through the image forming part 240 and a fixer 248 by the third conveyor 53A, is then conveyed from the third conveyor 53A to the second conveyor 52A at the merging part 59, and is conveyed to the post-processing device 300A.

[Post-Processing Device]

The configuration of the post-processing device 300A can be the same as that of the above-described first embodiment except for the configuration of the recording material conveyance path and a sheet ejector.

The post-processing device 300A includes a part of the second conveyor 52A, a fourth conveyor 353 and a fifth conveyor 350 into which the second conveyor 52A branches on the downstream side in the recording material conveyance direction, and the branching part 354 where the fourth conveyor 353 and the fifth conveyor 350 branch from the second conveyor 52A. The post-processing device 300A also includes a first ejector 355 that ejects the recording material S conveyed by the fourth conveyor 353, and a sheet ejection tray 356 on which the recording material S ejected from the first ejector 355 is stacked. Further, the post-processing device 300A also includes a second ejector 351 that ejects the recording material S conveyed by the fifth conveyor 350, and a sheet ejection tray 352 on which the recording material S ejected from the second ejector 351 is stacked.

In the post-processing device 300A, the recording material S conveyed by the second conveyor 52A, that is, the recording material S that has not passed through the image forming part 240 is conveyed from the branching part 58 to the fourth conveyor 353. Then, the recording material S conveyed by the fourth conveyor 353 is ejected by the first ejector 355.

In addition, in the post-processing device 300A, the recording material S that has been conveyed through the third conveyor 53A and passed through the image forming part 240 is conveyed to the fifth conveyor 350. Then, the recording material S conveyed by the fifth conveyor 350 is ejected by the second ejector 351.

[Functional Configuration of Controller]

The functional configuration of the controller 90 in the image forming system 20 can be the same as that of the above-described first embodiment.

The conveyance controller 95 conveys the recording material S by the first conveyor 51A in the recording material conveying device 500. Then, in the image forming device 200A, the conveyance controller 95 selects the conveyance path of the recording material S from the first conveyor 51A to either the second conveyor 52A or the third conveyor 53A, and switches the conveyance path of the recording material S at the branching part 58. Then, driving of the second conveyor 52A or the third conveyor 53A selected as the conveyance path is controlled to convey the recording material S. Further, in the post-processing device 300A, the conveyance controller 95 selects the conveyance path of the recording material S from the second conveyor 52A to either the fourth conveyor 353 or the fifth conveyor 350, and switches the conveyance path of the recording material S at the branching part 354. Then, the conveyance controller 95 controls driving of the fourth conveyor 353 or the fifth conveyor 350 selected as the conveyance path to convey the recording material S, and ejects the recording material S from the first ejector 355 or the second ejector 351.

In addition, the conveyance controller 95 conveys the recording material S whose recording material characteristics have been detected by the first detector 71 to the second conveyor 52A by switching the conveyance path at the branching part 58 in the image forming device 200A. On the other hand, the conveyance controller 95 conveys the recording material S whose recording material characteristics have not been detected by the first detector 71 to the third conveyor 53A by switching the conveyance path at the branching part 58 in the image forming device 200A.

As a result, the conveyance controller 95 conveys the recording material S whose recording material characteristics have been detected by the first detector 71 by the conveyance path bypassing the image forming part 240 in the image forming device 200A. In this configuration, since the recording material whose recording material characteristics have been detected by the first detector 71 does not pass through the image forming part 240, it is possible to curb a decrease in reliability of the image forming system 20.

In addition, the conveyance controller 95 also conveys the recording material S whose recording material characteristics have been detected to be out of an appropriate range by the second detector 72 to the second conveyor 52A by switching the conveyance path at the branching part 58 in the image forming device 200A. As a result, in the image forming device 200A, the recording material S whose recording material characteristics are out of the appropriate range is conveyed on a conveyance path bypassing the image forming part 240. Therefore, the recording material outside the appropriate range does not pass through the image forming part 240, and it is possible to curb a decrease in reliability of the image forming system 20.

[Detection of Recording Material Characteristics]

Figure 6:
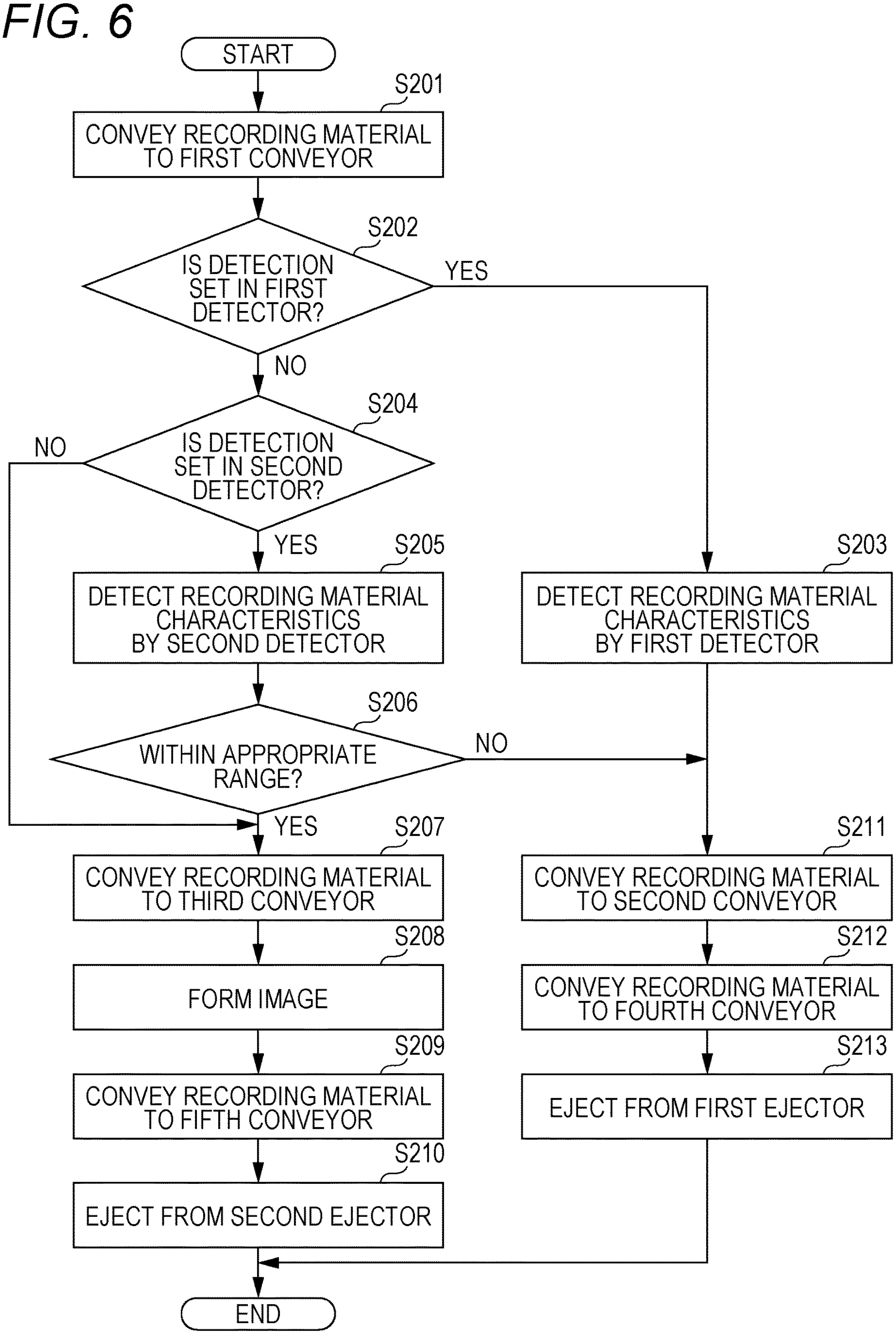
FIG. 6 is a flowchart of recording material characteristic detection processing in the image forming system according to the second embodiment.

Next, recording material characteristic detection processing in the image forming system 20 will be described. FIG. 6 is a flowchart of recording material characteristic detection processing. Note that in the flowchart illustrated in FIG. 6, conveyance of the recording material in the image forming system 20 and detection of recording material characteristics will be mainly described.

First, in the image forming system 20, the controller 90 conveys the recording material S from the conveyor 50 of the recording material supply device 100 to the first conveyor 51A of the recording material conveying device 500 (step S201).

Next, the controller 90 determines whether a measurement mode is set such that recording material characteristics of the recording material S are detected by the first detector 71 according to an instruction of the user or the like (step S202).

If the measurement by the first detector 71 is set (Yes in step S202), the detection controller 96 detects the recording material characteristics of the recording material S conveyed to the first conveyor 51A using the first detector 71 (step S203).

If the measurement by the first detector 71 is not set (No in step S202), the controller 90 determines whether the measurement mode is set such that the recording material characteristics of the recording material S are detected by the second detector 72 according to an instruction of the user or the like (step S204).

If the measurement by the second detector 72 is set (Yes in step S204), the detection controller 96 detects the recording material characteristics of the recording material S conveyed to the first conveyor 51A using the second detector 72 (step S205).

Next, the detection controller 96 determines whether the recording material characteristics of the recording material S detected by the second detector 72 are within an appropriate range set as an image forming condition (step S206).

If the measurement by the second detector 72 is not set (No in step S204) or if the recording material characteristics of the recording material S are within the appropriate range (Yes in step S206), the conveyance controller 95 conveys the recording material S conveyed by the first conveyor 51A to the third conveyor 53A by switching the conveyance path at the branching part 58 in the image forming device 200A (step S207).

Then, the conveyance controller 95 conveys the recording material S conveyed by the third conveyor 53A to the image forming part 240, and the image formation controller 97 drives the image forming part 240 to form an image on the recording material S (step S208).

Next, the conveyance controller 95 conveys the recording material S conveyed by the third conveyor 53A in the image forming device 200A from the merging part 59 to the second conveyor 52A, and then switches the conveyance path at the branching part 354 in the post-processing device 300A to convey the recording material S from the second conveyor 52A to the fifth conveyor 350 (step S209).

Then, the conveyance controller 95 ejects the recording material S conveyed by the fifth conveyor 350 from the second ejector 351 (step S210). The conveyance controller 95 ejects the recording material S from the second ejector 351 to eject the recording material S on which an image has been formed from the image forming system 20.

If the recording material characteristics of the recording material S are not within the appropriate range (No in step S206), or after the first detector 71 detects the recording material characteristics of the recording material S in step S203, the conveyance controller 95 conveys the recording material S conveyed by the first conveyor 51A to the second conveyor 52A by switching the conveyance path at the branching part 58 in the image forming device 200A (step S211).

Then, the conveyance controller 95 causes the recording material S conveyed by the second conveyor 52A in the image forming device 200A to pass through the merging part 59, switches the conveyance path at the branching part 354 in the post-processing device 300A, and conveys the recording material S from the second conveyor 52A to the fourth conveyor 353 (step S212).

Then, the conveyance controller 95 ejects the recording material S conveyed by the fourth conveyor 353 from the first ejector 355 (step S213). The conveyance controller 95 ejects the recording material S from the first ejector 355 to eject the recording material S on which no image is formed from the image forming system 20.

After the recording material S is carried out from the first ejector 355 or the second ejector 351, the processing according to this flowchart is terminated.

In the processing according to the above-described flowchart, recording material characteristics of the recording material S for which detection of recording material characteristics by the first detector 71 is set are detected by the first detector 71 arranged in the first conveyor 51A. Then, the recording material S whose recording material characteristics have been detected by the first detector 71 is conveyed to the second conveyor 52A, so that the recording material S is conveyed in the image forming device 200A without passing through the image forming part 240, and is ejected from the first ejector 355 of the post-processing device 300A. As a result, the recording material S charged by electrical detection in the first detector 71 or the recording material S having a crease or the like caused by contact can be ejected to the outside of the image forming system 20 without being conveyed to the image forming part 240 of the image forming device 200A.

As a result, in the image forming system 20, it is possible to curb occurrence of conveyance failure (jam) due to adhesion of the charged recording material S to the conveyor or the like in the image forming part 240 and curb inhibition of charge transfer in the electrophotographic process, and thereby curb a decrease in reliability of image formation.

Further, it is possible to curb occurrence of conveyance failure such as jam due to the recording material deformed by an external force at the time of detecting the recording material characteristics.

In addition, the recording material characteristics of the recording material S whose recording material characteristics are not detected by the first detector 71 are detected by the second detector 72 arranged in the first conveyor 51A. Then, in a case where the recording material characteristics detected by the second detector 72 are not within the predetermined range, the recording material S is conveyed to the second conveyor 52A, so that the recording material S is conveyed in the image forming device 200A without passing through the image forming part 240, and is ejected from the first ejector 355 of the post-processing device 300A. As a result, in the image forming system 20, it is possible to curb occurrence of conveyance failure (jam) and a decrease in reliability due to inhibition of charge transfer in the electrophotographic process.

<3. Third Embodiment of Recording Material Conveying Device and Image Forming System>

Next, a third embodiment of a recording material conveying device and an image forming system will be described. Note that the image forming system according to the third embodiment differs from the image forming system according to the above-described second embodiment only in the arrangement of a first detector. Therefore, only the configuration related to the first detector will be described, and the description of the same configurations as those of the above-described first and second embodiments will be omitted.

Figure 7:
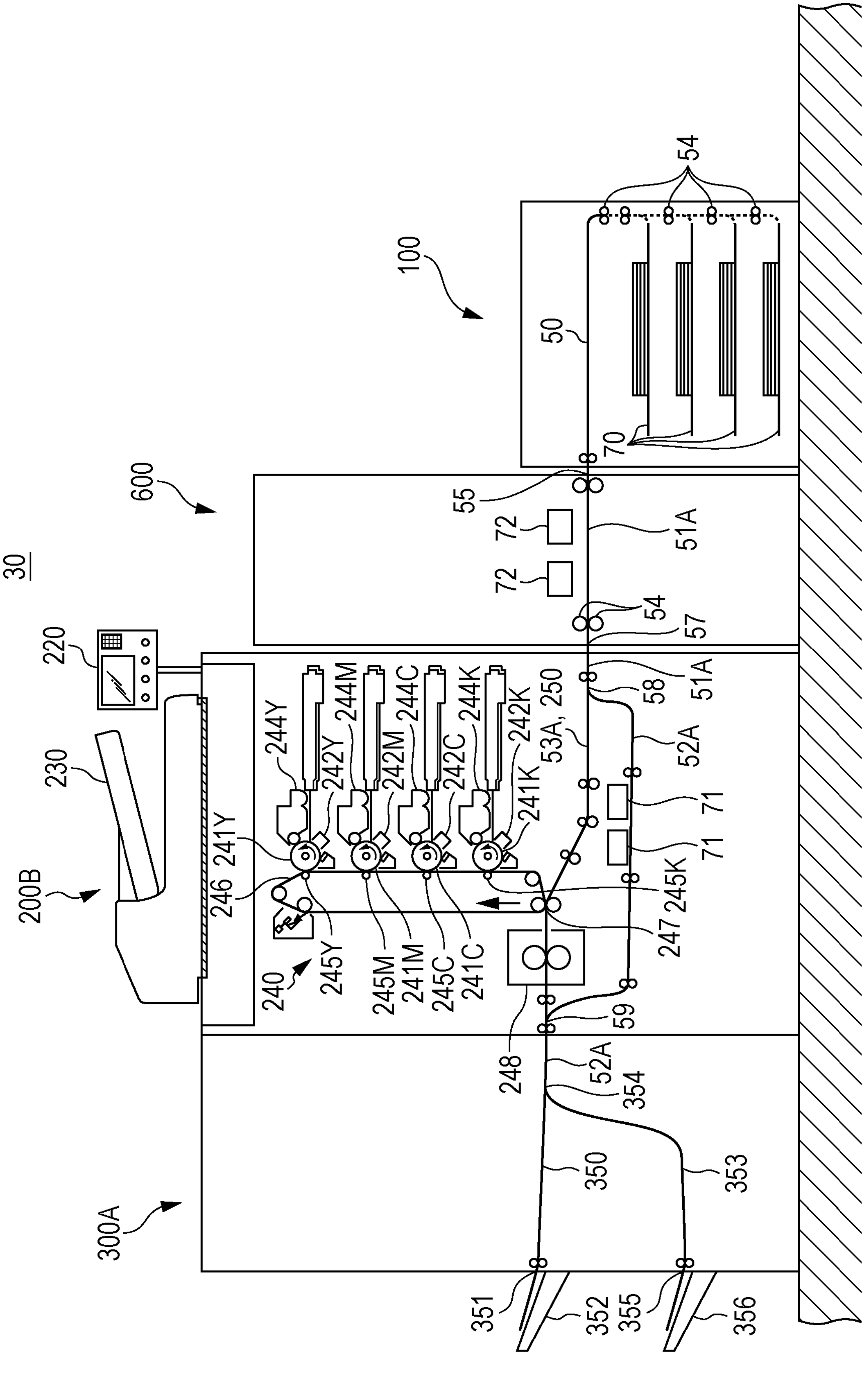
FIG. 7 is a diagram illustrating a schematic configuration of an image forming system according to a third embodiment.

FIG. 7 illustrates configurations of the recording material conveying device and the image forming system according to the third embodiment. As illustrated in FIG. 7, an image forming system 30 includes a recording material supply device 100, a recording material conveying device 600, an image forming device 200B, and a post-processing device 300A. In the image forming system 30 illustrated in FIG. 7, the recording material supply device 100 and the post-processing device 300A have the same configurations as those of the above-described second embodiment. In addition, the recording material conveying device 600 and the image forming device 200B have the same configurations as those of the above-described second embodiment except for the arrangement of a first detector 71.

[First Detector]

In the image forming system 30 illustrated in FIG. 7, the first detector 71 is arranged in a second conveyor 52A in the image forming device 200B. Therefore, only a first conveyor 51A and a second detector 72 are arranged in the recording material conveying device 600.

In addition, the image forming device 200B includes the second conveyor 52A and a third conveyor 53A branched from the first conveyor 51A at a branching part 58 on the downstream side of the first conveyor 51A in the recording material conveyance direction. Then, in the image forming device 200B, the first detector 71 is arranged in the second conveyor 52A.

[Functional Configuration of Controller]

The functional configuration of a controller 90 in the image forming system 30 can be the same as those of the above-described first and second embodiments.

A conveyance controller 95 conveys a recording material S by the first conveyor 51A in the recording material conveying device 600. Then, the recording material characteristics of the recording material S whose recording material characteristics are to be detected by the second detector 72 are detected by the second detector 72 arranged in the first conveyor 51A.

In addition, the conveyance controller 95 conveys the recording material S whose recording material characteristics are detected by the first detector 71 to the second conveyor 52A by switching the conveyance path at the branching part 58 in the image forming device 200B. Then, the recording material characteristics of the recording material S are detected by the first detector 71 arranged in the second conveyor 52A.

On the other hand, the conveyance controller 95 conveys the recording material S whose recording material characteristics are not detected by the first detector 71 to the third conveyor 53A by switching the conveyance path at the branching part 58 in the image forming device 200B.

As a result, the conveyance controller 95 conveys the recording material S whose recording material characteristics are detected by the first detector 71 by a conveyance path bypassing the image forming part 240 in the image forming device 200B. In this configuration, since the recording material whose recording material characteristics have been detected by the first detector 71 does not pass through the image forming part 240, it is possible to curb a decrease in reliability of the image forming system 20.

In addition, the conveyance controller 95 also conveys the recording material S whose recording material characteristics have been detected to be out of an appropriate range by the second detector 72 to the second conveyor 52A by switching the conveyance path at the branching part 58 in the image forming device 200B. As a result, in the image forming device 200B, the recording material S whose recording material characteristics are out of the appropriate range is conveyed on a conveyance path bypassing the image forming part 240. Therefore, the recording material outside the appropriate range does not pass through the image forming part 240, and it is possible to curb a decrease in reliability of the image forming system 20.

Although embodiments of the present invention have been described and illustrated in detail, the disclosed embodiments are made for purposes of illustration and example only and not limitation. The scope of the present invention should be interpreted by terms of the appended claims, and various modifications and changes can be made without departing from the configuration of the present invention.

What is claimed is:

1. A recording material conveying device comprising:

a first conveyor that conveys a recording material supplied from a recording material supply part;

a second conveyor that branches from the first conveyor and conveys the recording material without passing through an image forming part;

a third conveyor that branches from the first conveyor and conveys the recording material via the image forming part; and a detector that detects a recording material characteristic of the recording material, the detector including a first detector arranged in the second conveyor, wherein the recording material whose recording material characteristic has been detected by the detector can be ejected from the second conveyor.

2. The recording material conveying device according to claim 1, wherein the second conveyor includes a first ejector that ejects the recording material whose recording material characteristic has been detected by the first detector.

3. The recording material conveying device according to claim 2, further comprising a second ejector that ejects the recording material conveyed by the third conveyor to an external device connected to the third conveyor.

4. The recording material conveying device according to claim 1, wherein on a downstream side in a conveyance direction of the recording material with respect to a branching part where the second conveyor and the third conveyor branch from the first conveyor, a conveyance distance of the recording material of the second conveyor is equal to or longer than a long side of a largest standard size that can be conveyed.

5. The recording material conveying device according to claim 1, wherein the detector includes a second detector that detects a recording material characteristic of the recording material arranged in the first conveyor.

6. The recording material conveying device according to claim 5, further comprising a hardware processor that controls conveyance of the recording material in the first conveyor, the second conveyor, and the third conveyor and detection of the recording material characteristic by the first detector and the second detector, wherein the hardware processor conveys a second recording material in the first conveyor and the third conveyor while the recording material characteristic of a first recording material is detected by the first detector in the second conveyor.

7. The recording material conveying device according to claim 6, wherein the hardware processor stops conveyance of or reduces a conveyance speed of the recording material conveyed by the second conveyor while the recording material characteristic is detected by the first detector.

8. The recording material conveying device according to claim 6, wherein the hardware processor detects the recording material characteristic by the second detector without reducing a conveyance speed of the recording material.

9. The recording material conveying device according to claim 6, wherein in a job of conveying a plurality of recording materials, the hardware processor causes the first detector to detect the recording material characteristic in the second conveyor only for some of the plurality of recording materials.

10. The recording material conveying device according to claim 1, wherein the first detector detects an electrical resistance value of the recording material as the recording material characteristic.

11. The recording material conveying device according to claim 1, wherein the first detector detects rigidity of the recording material as the recording material characteristic.

12. An image forming system including an image forming part that forms an image on a recording material, the image forming system comprising:

a first conveyor that conveys the recording material supplied from a recording material supply part;

a second conveyor that branches from the first conveyor and conveys the recording material without passing through the image forming part;

a third conveyor that branches from the first conveyor and conveys the recording material via the image forming part;

a detector that detects a recording material characteristic of the recording material, the detector including a first detector arranged in the second conveyor; and a hardware processor that controls conveyance of the recording material whose recording material characteristic has been detected by the detector so that the recording material can be ejected from the second conveyor.

13. The image forming system according to claim 12, wherein the second conveyor includes a first ejector that ejects the recording material whose recording material characteristic has been detected by the first detector.

14. The image forming system according to claim 13, further comprising a merging part where the second conveyor and the third conveyor merge on a downstream side in a conveyance direction of the recording material in the image forming part, wherein the second conveyor is connected to the first ejector on the downstream side in the conveyance direction of the recording material with respect to the merging part.

15. The image forming system according to claim 14, further comprising:

a fourth conveyor and a fifth conveyor that branch from the second conveyor on the downstream side in the conveyance direction of the recording material with respect to the merging part and form a conveyance path of the recording material on the downstream side in the conveyance direction of the recording material with respect to the second conveyor; and a second ejector that is connected to the fifth conveyor and ejects the recording material.

16. The image forming system according to claim 15, wherein the hardware processor ejects the recording material conveyed by the second conveyor from the first ejector via the fourth conveyor, and ejects the recording material conveyed by the third conveyor and having passed through the image forming part from the second ejector via the fifth conveyor.

17. The image forming system according to claim 12, wherein the detector includes a second detector that detects a recording material characteristic of the recording material arranged in the first conveyor, and the hardware processor controls detection of the recording material characteristic by the second detector.

18. The image forming system according to claim 17, wherein the hardware processor selects a conveyance path of the recording material from a second conveyor and a third conveyor on the basis of the recording material characteristic detected by the second detector.

* * * * *